US006553174B2

(12) United States Patent
Winer

(10) Patent No.: US 6,553,174 B2
(45) Date of Patent: Apr. 22, 2003

(54) OPTICAL FIBER ARRAY ASSEMBLY WITH PREFORM FOR SUPPORTING FIBERS

(75) Inventor: Theresa A. Winer, Corning, NY (US)

(73) Assignee: Corning Incorporated, Corning, NY (US)

( * ) Notice: Subject to any disclaimer, the term of this patent is extended or adjusted under 35 U.S.C. 154(b) by 11 days.

(21) Appl. No.: 09/844,873

(22) Filed: Apr. 27, 2001

(65) Prior Publication Data

US 2002/0159748 A1 Oct. 31, 2002

(51) Int. Cl.[7] .................................................. G02B 6/00
(52) U.S. Cl. .................... 385/137; 385/89; 385/115; 385/120; 65/411
(58) Field of Search ......................... 385/89, 115, 120, 385/137; 65/409, 411, 428

(56) References Cited

U.S. PATENT DOCUMENTS 4,812,002 A * 3/1989 Kato et al. ............... 350/96.18
5,093,879 A * 3/1992 Bergman et al. ............... 385/93
5,371,822 A * 12/1994 Horwitz et al. ............... 385/89

* cited by examiner

Primary Examiner—Akm E. Ullah
Assistant Examiner—Jennifer Doan

(57) ABSTRACT

A preform having an array of axially extending holes is reduced in diameter for adjusting a spacing between the holes as well as the hole diameters to desired dimensions. Sections of the reduced preform having the desired dimensions are removed for supporting arrays of optical fibers in predetermined patterns. Tips of the fibers are mounted flush with a mounting surface of one of the preform sections, and the preform section is mounted together with a common support for an array of optical conveyances arranged in the same pattern for collectively coupling the array of fibers to the array of optical conveyances. Various active and passive optical components including VCSELs, MEMS, and even other fiber arrays can be among the optical conveyances collectively coupled to the fiber array.

51 Claims, 7 Drawing Sheets ly coupled to similarly pattered arrays of
OPTICAL FIBER ARRAY ASSEMBLY WITH PREFORM FOR SUPPORTING FIBERS

TECHNICAL FIELD

Connections between arrays of optical fibers and arrays of other optical conveyances including active and passive devices such as emitters, receivers, MEMS (MicroElectroMechanical Systems), and planar waveguides enable the distribution of optical information throughout networks, particularly optical communications systems. Optical fibers supported in array formats can also be used to gather or distribute localized light for other purposes including illumination and optical data acquisition.

BACKGROUND OF INVENTION

Optical networks incorporate various combinations of emitters, receivers, routers, MEMS, and other active and passive components, all requiring connections to bundles or other groups of optical fibers. Couplings between the optical fibers and other such optical conveyances are often made individually. To minimize losses of light, the couplings generally require exact alignment between the optical fibers and the other optical conveyances. Entrance and exit apertures must also match, or focusing optics can be required to resize or reshape the light into a corresponding form. Once aligned, the individual fibers and optical conveyances must be secured together.

Connections between individual optical fibers and other optical conveyances are exacting and costly. Efforts to simplify and expedite the coupling of groups of fibers have included the use of coupling mechanisms, such as V-grooved blocks, for spacing, aligning, and securing rows of fibers to corresponding rows of other optical conveyances including other rows of optical fibers. Although coupling by row is more efficient than coupling fibers individually, the coupling of large numbers of rows of fibers can still be costly and time consuming.

More efficient couplings have been made between two dimensional arrays of optical fibers and corresponding arrays of active components including lasers and other opto-electronic emitters or receivers. One example allows for the mounting of individual fibers within openings in a key structure containing optical waveguides. The key structure mates with a keyway machined into a another structure containing corresponding waveguides in communication with a plurality of semiconductor chips. The fibers must be carefully mounted in the key structure to avoid losses, and the additional interface between the key and keyway structures further reduces efficiency.

Another opto-electronic circuit package features a lid containing an array of laser-drilled holes for receiving a two-dimensional array of fibers. The lid containing the fiber array is mounted on a base in alignment with a circuit die containing an array of emitters or receivers. Both the circuit die and the lid are referenced with respect to the base to align the fiber array with the array of emitters or receivers. The individual formation of closely spaced holes in the lid is difficult to accomplish with the required consistency and precision.

SUMMARY OF INVENTION

My invention utilizes preforms, particularly glass, glass-ceramic, or ceramic preforms in the shape of cylinders or other solid forms, for arranging an array of optical fibers in a predetermined configuration. The preform, which has formed within it a pattern of holes for supporting the optical fibers, is adjusted in size for positioning the fibers in a predetermined pattern. So arranged, the fibers can be collectively aligned and coupled to similarly pattered arrays of other optical conveyances, including arrays of emitters, receivers, and various waveguide structures. Improved efficiencies, lower cost, and ease of manufacture are anticipated as benefits.

One example in which my invention can be used to arrange optical fibers in a desired array format begins with an original preform having an axis and axially extending holes arranged in a predetermined pattern. Both the size of the holes and their spacing are preferably oversized with respect to the intended pattern for arranging the fibers. Heat is applied to the preform, if necessary, to transform the preform into a malleable state; and a cross-sectional reducing force is applied to reduce the scale of the predetermined pattern of holes in the preform. A transverse section of the preform containing a desired reduction in the scale of the hole pattern is removed. Optical fibers are mounted in the holes to arrange the fibers in the desired array format.

Fabricating the original preform can be accomplished by various means including extruding a blank through a die that forms the axially extending holes or assembling the preform from a bundle of rods or tubes. The preform itself is preferably made of glass, glass-ceramic, or ceramic to provide thermal stability to the final array. The cross-sectional reducing force can involve the application of various pushing and pulling forces including combinations of such forces. For example, a drawing force can be applied that stretches the preform along its axis to reduce a scale of the predetermined pattern of holes as a function of drawn position along the axis of the preform. The transverse section removed from the preform is taken from a position along the preform axis at which the predetermined pattern is reduced to the desired scale. Alternatively, an extruding force can be applied along the preform axis to push the preform through a conventional reducing die for similarly reducing the scale of the predetermined pattern of holes along the axis of the preform.

Preferably, the preform is cylindrical in shape having an initial diameter at least 25 percent larger than the diameter of the transverse section removed from the reduced preform. The fibers can be mounted in the preform either before or after the preform is reduced in size. For example, the fibers can be mounted and secured in the holes of the transverse section after it has been removed from the preform, or the fibers can be mounted in the preform before it is reduced and can be secured in the holes by their subsequent reduction in diameter. To protect the fibers during the reduction, the preform can be made of a material with a lower transition temperature than the material content of the fibers.

My invention can also be practiced as a way of coupling an array of optical fibers to an array of optical conveyances. The preform is fabricated having an array of axially extending holes. Collapsing the preform about its axis reduces a spacing pattern of the holes. A transverse section removed from the collapsed preform contains a spacing pattern of the holes matching a spacing pattern of the optical conveyances within the array of optical conveyances. The optical fibers are assembled within the holes into the array of optical fibers, and the transverse section of the collapsed preform is mounted along with the assembled fibers together with a common support of the array of optical conveyances for collectively aligning the array of fibers to the array of optical conveyances.

Tips of the fibers can be preshaped prior to insertion into the preform or can be collectively treated after insertion to provide apertures compatible with those of the individual optical conveyances. For example, a mating surface of the transverse section of the collapsed preform can be polished together with protruding tips of the fibers to provide a consistent mounting surface adjacent to the array of optical conveyances. If reshaping of the light entering or exiting the optical fibers is required, a lens array can be inserted between the transverse preform section and the common support of the optical conveyances to improve coupling efficiency between the array of fibers and the array of optical conveyances.

The optical conveyances ordered within the array can include active or passive optical components including lasers, MEMS, and other devices for performing various functions. For example, a two-dimensional array of optical conveyances can be formed by a stack of optoelectronic or optoelectromechanic devices. The common support for the optical conveyances can also be a single wafer having optoelectronic (or optoelectromechanic) features formed in its surface such as vertical cavity surface emitting lasers (VCSELs). Active or passive waveguide structures can also be used in either a stack or surface communicating form. The transverse section of the preform, the lens array, and the common support for the optical conveyances can all take plate-shaped forms that can be readily stacked together to form an efficient compact coupling structure.

Preferably, both the array of fibers and the array of optical conveyances are arranged as two-dimensional arrays. Alignment of the arrays can take place by aligning two relatively displaced fibers with two corresponding optical conveyances or by matching features of the sectioned preform with corresponding features on the common support for the optical conveyances. Combinations and variations of these techniques are also possible for collectively aligning the array of optical fibers with the array of other optical conveyances.

It is to be understood that both the foregoing general description and the following detailed description are merely exemplary of the invention and are intended to provide an overview or framework for understanding the nature and character of the invention as claimed. The accompanying drawings are included to provide a further understanding of the invention and are incorporated in and constitute a part of the specification. The drawings illustrate various embodiments of the invention and together with the description serve to explain the principles and operation of the invention.

DRAWINGS

DETAILED DESCRIPTION

Figure 1:
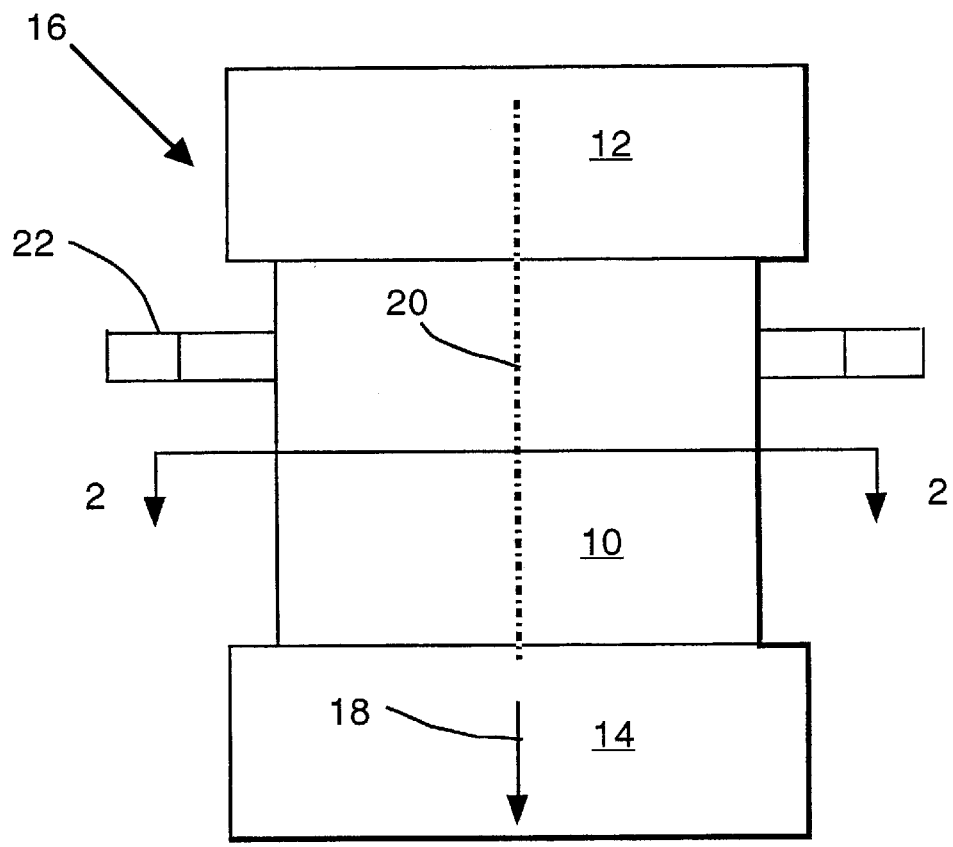
FIG. 1 is a diagrammatic side view of a drawing apparatus arranged for drawing a cylindrical preform.

A cylindrical preform 10 made of a thermally stable material such as glass, glass-ceramic, or ceramic is shown in FIG. 1. Opposite ends of the preform are suspended between a headstock 12 and a tailstock 14 of a drawing apparatus 16. The tailstock 14 is relatively movable in the direction of arrow 18 along a central axis 20 of the cylindrical preform 10. A ring burner 22 surrounds the preform 10 between the headstock 12 and the tailstock 14 for heating the preform 10 to a transition temperature. Although shown as a cylinder, the preform can take a variety of other forms, such as a parallelepiped, compatible with its intended further processing.

Figure 2:
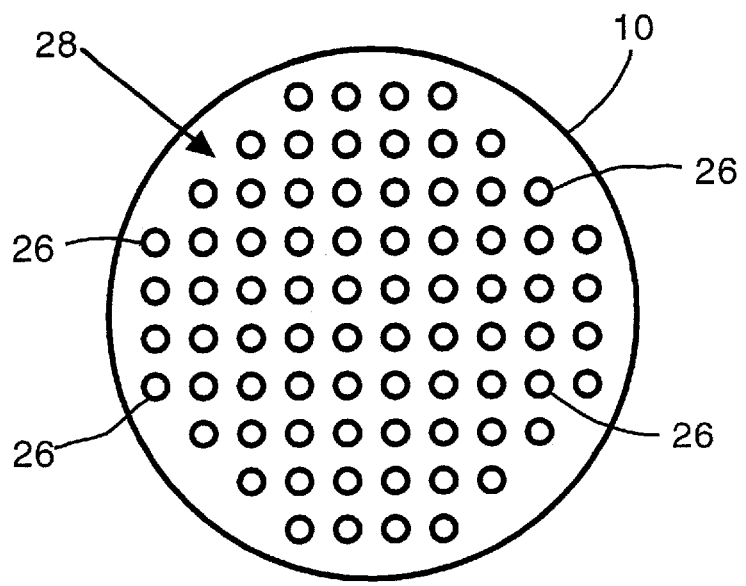
FIG. 2 is a cross-sectional axial view through the preform showing an array of holes for supporting a bundle of fibers.

An end view of the preform 10 shown in FIG. 2 reveals axially extending holes 26 arranged in a two-dimensional array 28. Except in scale, the hole array 28 is arranged in a pattern corresponding to a desired pattern for aligning an array of fibers with an array of other optical conveyances (neither of which is yet shown). The array 28 is preferably regularly ordered with evenly spaced rows and columns, but differently ordered patterns with other spacing schemes are possible. The holes 26 of the hole array 28 can be formed by extruding the preform 10 through a die or by assembling a bundle of rods or tubes. Extrusion technologies for making such preforms are well established, but further details can be found in U.S. Pat. No. 3,790,654 to Bagley and U.S. Pat. No. 4,902,216 to Cunningham et al., which are both hereby incorporated by reference.

The application of heat from the ring burner 22 combined with the application of a drawing force (i.e., a cross-sectional reducing force) in the direction of arrow 18 along the central axis 20 elongates the preform 10 while correspondingly reducing its diameter. During the drawing process, a softened portion of the preform 10 uniformly collapses about the central axis 20, reducing the scale of the hole array 28 but maintaining its overall pattern. Both a spacing between the holes 26 and a diameter of the holes 26 uniformly reduce in size.

Figure 3:
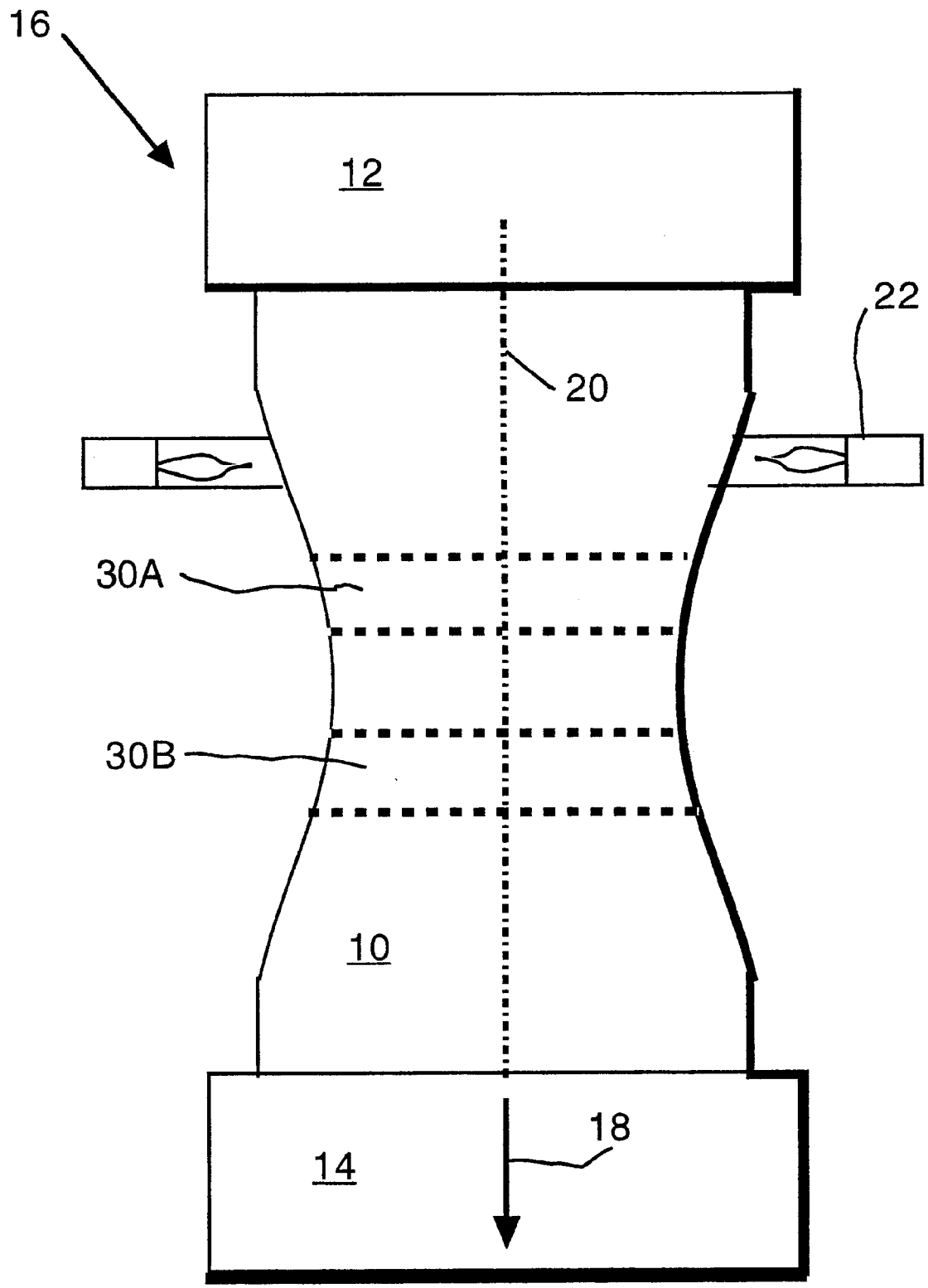
FIG. 3 is a side view similar to FIG. 1 showing the cylindrical preform drawn into a more hyperbolic shape for sectioning into appropriately dimensioned fiber array support structures.

In an elongated state illustrated by FIG. 3, the preform 10 has the approximate shape of a hyperboloid with a diameter varying through a minimum along the central axis 20. The scale of the hole array 28 also varies with the preform diameter along the central axis 20. Transverse sections 30A and 30B are sliced, cut, or otherwise removed from the collapsed preform 10 at a diameter having a desired hole spacing and diameter dimensions for the hole array 28.

Figure 4:
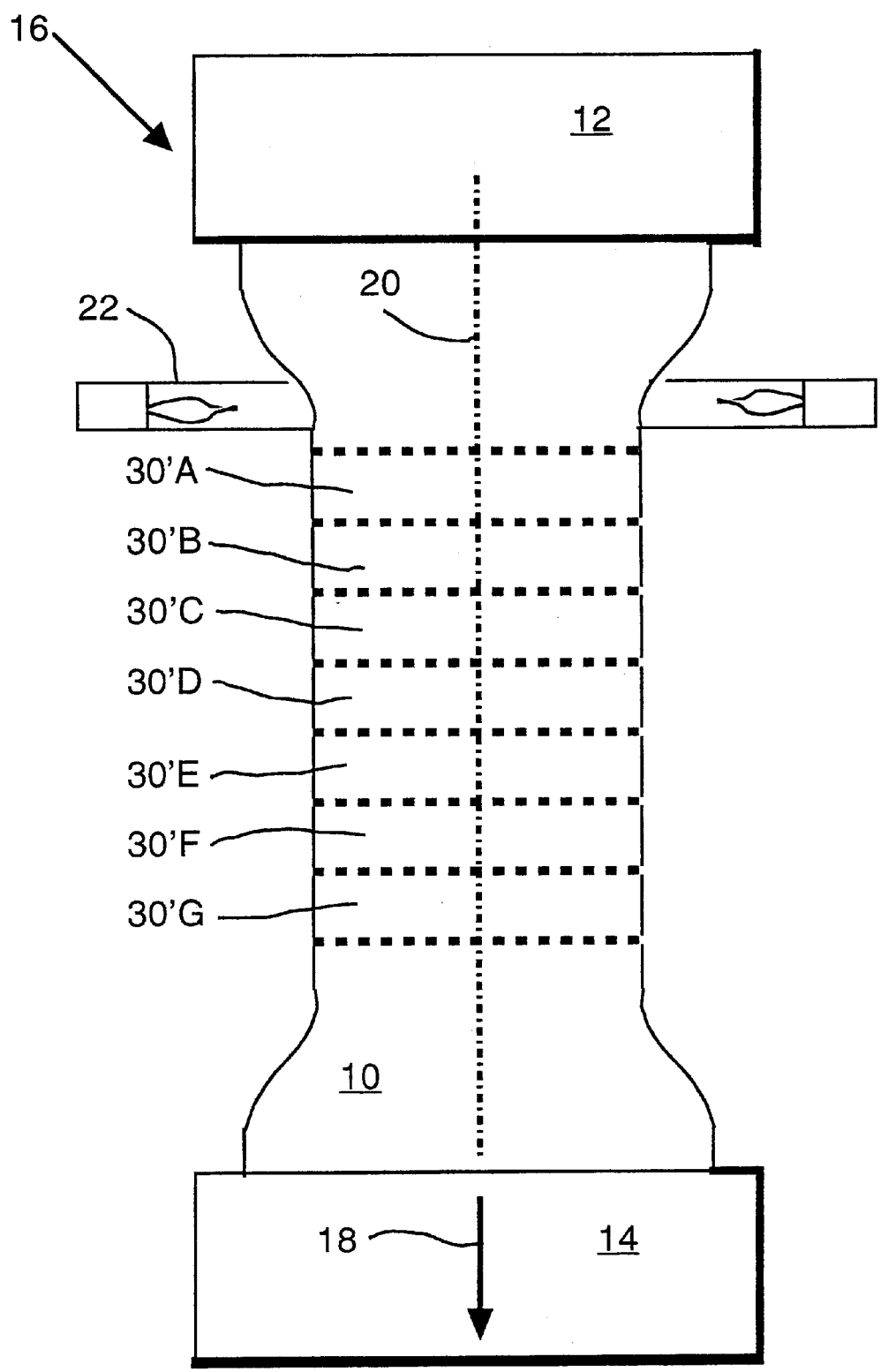
FIG. 4 is another side view similar to FIG. 1 in which the cylindrical preform is drawn out at a constant diameter yielding additional sections dimensioned for supporting fiber arrays.

Under controlled conditions of temperature and drawing force, the preform 10 can also be drawn to a constant diameter as shown in FIG. 4. The drawing techniques of both FIG. 3 and FIG. 4 are conventional and well understood in the art. The constant drawn diameter of the preform 10 in FIG. 4 yields a plurality of transverse sections 30'A, 30'B, 30'C, 30'D, 30'E, 30'F, and 30'G that can be cut out of the preform at the desired diameter.

The preform 10 can be made at virtually any diameter, but is expected to be in the range of 5 to 20 centimeters. The size reduction of the preform sections 30 removed from the preform 10 is expected to be in a range of 25 to 50 percent. However, the actual reduction depends upon the requirements for achieving hole spacing and diameter dimensions in a matching array pattern. The thickness of the preform sections 30 is expected to be around five to ten millimeters, which is preferably chosen as an optimum dimension of wall height to hole size required to accurately support and secure the fibers 46 in the desired array 48 (see FIG. 6).

Figure 5:
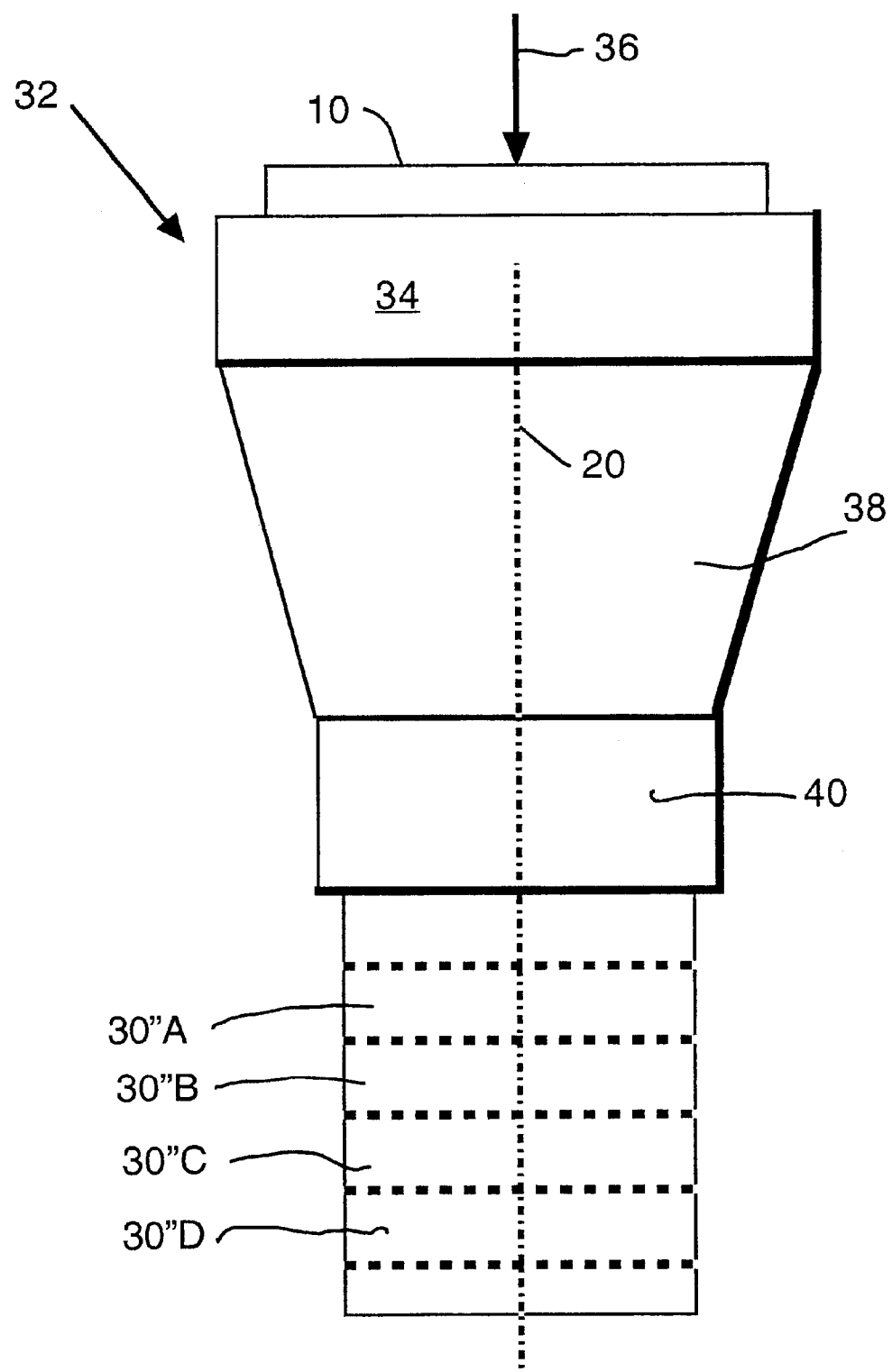
FIG. 5 is another side view similar to FIG. 1 showing an extruding apparatus with a reducing die for similarly reducing the diameter of the preform.

Instead of reducing the diameter of the preform 10 by drawing, FIG. 5 depicts a similar diameter reduction for the preform 10 by extrusion. An extruding apparatus 32 has a conical reducing die 34 through which the preform 10 is pushed in the direction of extruding force 36. Prior to extrusion, the holes 26 are preferably filled with a plasticized material, such as micro-crystalline wax, having a density matching the density of the surrounding preform structure for preserving the integrity of the holes 26 during the extrusion process. Heat is applied, if necessary to transform the preform into a malleable state or to match the viscoplastic properties of the preform and filler for extruding. More details of such reducing processes are provided in co-assigned U.S. patent applications No. 09/211,379, filed Dec. 14, 1998, and entitled "Manufacture of Cellular Honeycomb Structures" and No. 09/360,672, filed July 26 1999, and entitled "Method of Fabricating Photonic Structures", which are hereby incorporated by reference.

The reducing die 34 includes a tapering section 38 for progressively reducing the diameter of the preform 10 and a stabilizing section 40 for fixing the diameter of the preform 10 at a desired reduced dimension. The wax, which can have a transition temperature below that of the preform 10, can be melted from the holes 26 after the desired diameter is reached. A diametrical reduction of up to 50 percent or more is possible, which can more than quadruple the density of the holes 26 in the reduced preform, The constant drawn diameter of the preform 10 in FIG. 5 yields a plurality of transverse sections 30"A, 30"B, 30"C, 30"D that can be cut out of the preform at the desired diameter. Of course, more or less sections 30" can be removed from the reduced preform depending upon the original dimensions of the preform 10 and other processing variables.

Figure 6:
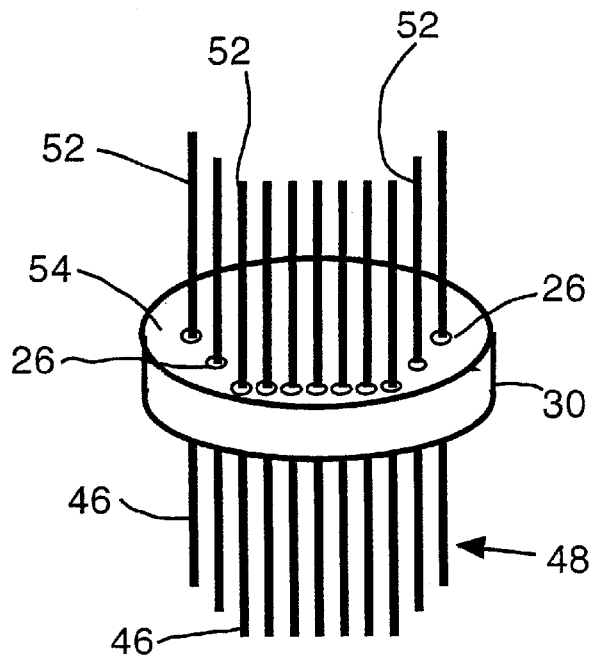
FIG. 6 is a perspective view showing a fiber array extending through a supporting preform section.
Figure 7:
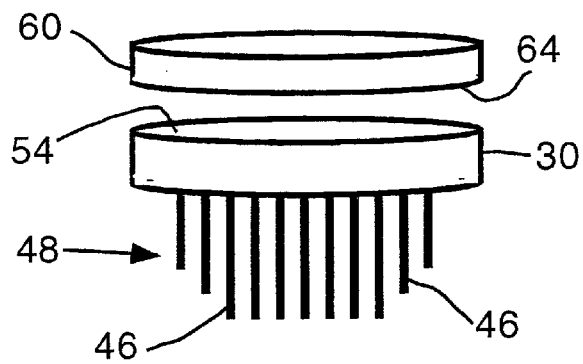
FIG. 7 is a plan view showing an array of optical conveyances in a mounting surface of a common support.
Figure 8:
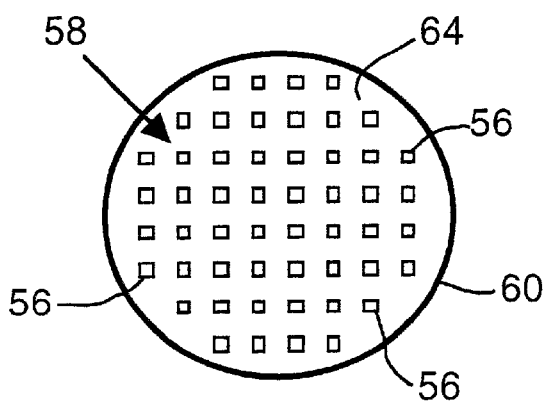
FIG. 8 is a perspective view showing the common support for the array of optical conveyances aligned with the preform section supporting the fiber array.

However reduced, FIGS. 6–8 show how an exemplary preform section 30 receives individual fibers 46 of a fiber array 48 for coupling the fibers 46 to individual optical conveyances 56 arranged in a similarly sized and spaced array 58. The fibers 46 shown in FIG. 6 are inserted through the holes 26 in the preform section 30. Conventional adhesives or other securing process such as a glass/ceramic reflow processes can be used to secure the fibers 46 in place within the preform section 30. Reducing dies (not shown) or other means can be used to further adjust the size or spacing of the holes 26.

Excess lengths 52 of the fibers 46 can be withdrawn, trimmed, or polished flush with a mounting surface 54 of the preform section 30 for coupling the fibers 46 to the corresponding array 58 of optical conveyances 56. Tips of the fibers 46 can be cleaved, polished, or otherwise shaped prior to insertion into the preform section 30 (e.g., forming an angle-cleave or fiber lens) or can be machined or polished afterwards to exhibit desired aperture properties. Preferably, the fiber tips are polished flush with the mounting surface 54 of the preform section 30 to simplify assembly and to assure uniform optical aperture characteristics among the tips of the fibers 46.

A common support 60 preferably supports the optical conveyances 56 in the corresponding array 58. Apertures of the optical conveyances 56 can project from or are preferably formed flush with a mounting surface 64 of the common support 60 as shown. The mounting surface 64 of the common support 60 can be mated together with the mounting surface 54 of the preform section 30 to collectively couple the fiber array 48 to the array 58 of optical conveyances 56. The collective alignment of the fibers 46 and the optical conveyances 56 can be accomplished in various ways such as by aligning to two separate pairings of the fibers 46 and conveyances 56 or by aligning marks or other features of the preform section 30 and common support 60. Adhesives, mechanical interlocks, or glass reflow processes can be used to secure the preform section 30 together with the common support.

The optical conveyances 56 can be active or passive optical devices. For example, active devices such as emitters, receivers, or dynamically controlled devices and passive devices such as planar waveguides, routers, or optical fibers can be formed or otherwise assembled together as the array 58. Particularly suitable to this application are vertical cavity surface emitting lasers (VCSELs) that can be formed in an array format on the surface of a common wafer support and MicroElectroMechanical Systems (MEMS).

The common support 60 is preferably a wafer, a wafer section, or other substrate upon which the optical conveyances 56 are formed or through which they pass. In addition, the common support 60 can be formed by a stack or other arrangement of substrates for supporting the optical conveyances 56 in the desired array 58. Another preform can be resized similar to the preform segment 30 and function as the common support 60 for coupling two matching arrays of fibers together.

Figure 9:
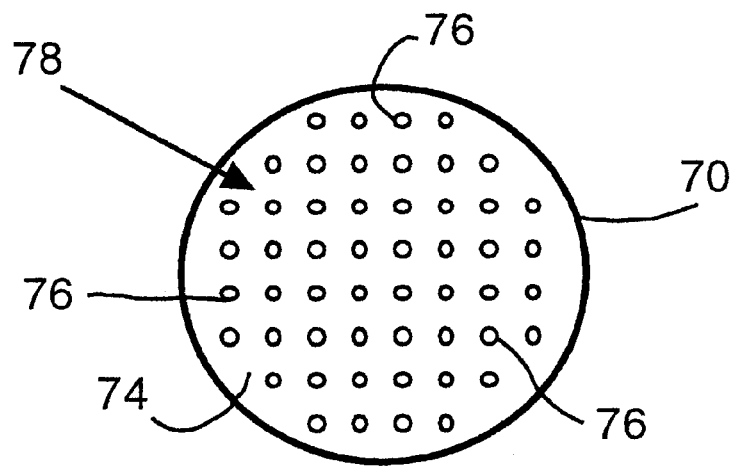
FIG. 9 is a plan view of an intermediate coupling mechanism having a similarly patterned array of lenses.
Figure 10:
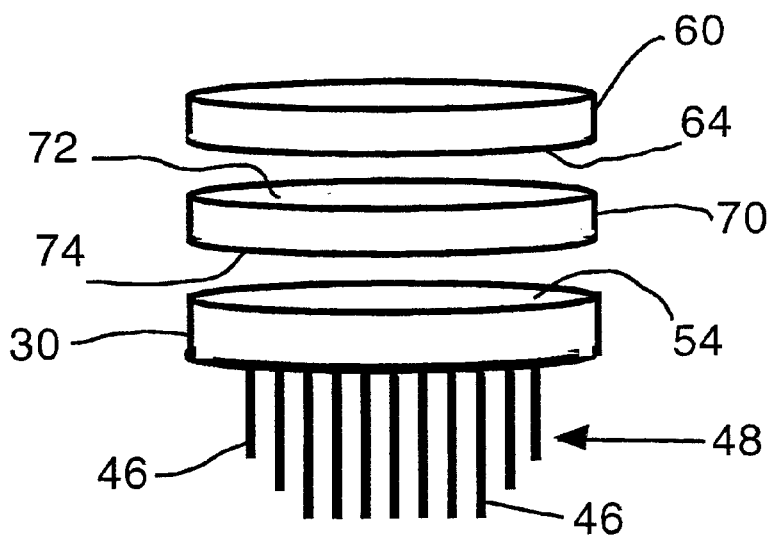
FIG. 10 is a perspective view showing the common support for the array of optical conveyances, the intermediate coupling mechanism, and the preform section supporting the fiber array aligned with each other for forming a common stack.

FIGS. 9 and 10 illustrate the addition of an intermediate optical coupling component 70 having mounting surfaces 72 and 74. Within the intermediate coupling component 70 are individual lenses 76 arranged in an array 78 matching the patterns of the fiber array 48 and the optical conveyance array 58, The lenses 76 can be used to better relate aperture characteristics of the fibers 46 and optical conveyances 56 to improve coupling efficiency. The mounting surfaces 72 and 74 mate with the mounting surface 54 of the preform section 30 and the mounting surface 64 of the common support 60 to form an optically aligned stack of the three arrays 48, 58, and 78. The preform section 30, the common support 60, and the intermediate coupling component 70 all preferably take plate-shaped forms that can be readily stacked together to form an efficient compact coupling structure.

Figure 11:
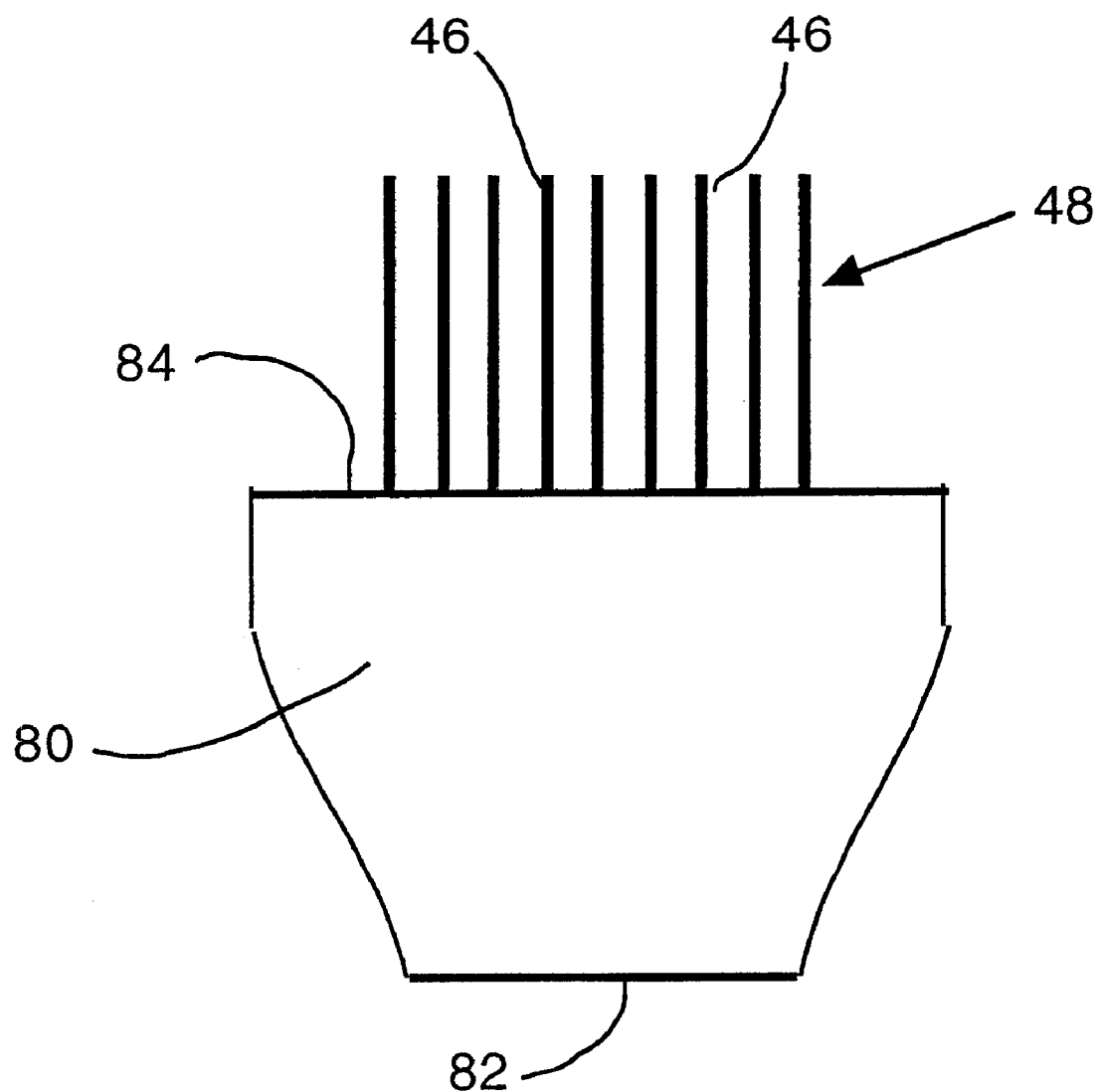
FIG. 11 is a side view of a preform section containing fibers mounted prior to the reduction in the preform diameter.

The fibers 46 of the fiber array 48 can be inserted into the transverse sections of the preform 10 either before or after the preform 10 is reduced in diameter. FIG. 11 shows a preform section 80 sliced at a single reduced-diameter end 82, leaving the fibers 46 extending through one of the original ends 84 of the preform section 80. The reduction in the diameter of the preform section 80 also correspondingly reduces diameters of the holes 26 containing the fibers 46 for securing the fibers 46 in place within the holes 26 (i.e., a shrink-fit engagement). Adhesives such as epoxy or other flexible materials can be used to cushion the fibers 46 within the holes 26. The preform section 80 can be made of a glass, glass-ceramic, or ceramic material that has a transition temperature less than the materials composing the fibers 46 to allow the preform section 80 to be drawn or otherwise reduced in diameter without damaging the fibers 46.

In addition to functioning as an array-to-array coupling mechanism, my new preform-supported array assembly can be used for other purposes, including those related to arrayed forms of illumination or optical data acquisition. For example, the array of preform-supported fibers can function as individually controlled sources of illumination. Similarly, the array of preform-supported fibers can function as individual optical pickups that collect light for purposes of analysis, such as spectrometric analysis. Lens assemblies can be used in conjunction with the preform-supported structures to further direct volumes of light into or out of the fibers. In addition, my new preform-supported array assembly can be used as a fiber array block.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

I claim:

1. A method of coupling an array of optical fibers to an array of optical conveyances comprising steps of:
   arranging a preform having an axis and an array of axially extending holes;
   collapsing the preform about its axis for reducing a spacing pattern of the holes;
   removing a transverse section from the collapsed preform containing a spacing pattern of the holes matching a spacing pattern of the optical conveyances within the array of optical conveyances;
   assembling the optical fibers within the holes into the array of optical fibers; and
   mounting the transverse section of the collapsed preform along with the assembled fibers together with a common support of the array of optical conveyances for collectively aligning the array of fibers to the array of optical conveyances.

2. The method of claim 1 in which the step of arranging includes forming the axially extending holes with diameters larger than diameters of the assembled fibers.

3. The method of claim 2 in which the step of collapsing includes reducing the diameters of the axially extending holes so that the assembled fibers are more precisely located within the transverse section in desired positions of alignment with the array of optical conveyances.

4. The method of claim 1 in which the step of arranging includes forming the axially extending holes in a pattern that is larger in scale than the pattern of the array of optical conveyances.

5. The method of claim 4 in which the step of collapsing reduces the scale of the pattern of axially extending holes in positions along the axis of the preform.

6. The method of claim 1 in which the step of collapsing includes applying a drawing force that stretches the preform along its axis for reducing the spacing pattern of the holes.

7. The method of claim 6 including a further step of selecting a transverse section along the axis of the collapsed preform where the spacing pattern of the holes matches the spacing pattern of the optical conveyances within the array of optical conveyances.

8. The method of claim 6 in which the preform is drawn to a constant reduced diameter in a region along its axis and the step of removing the transverse section includes removing a plurality of adjacent transverse sections at the constant reduced diameter.

9. The method of claim 1 in which the step of collapsing includes applying an extruding force that forces the preform through a reducing die for reducing the spacing pattern of the holes.

10. The method of claim 9 in which the step of collapsing includes filling the holes with a material for preserving hole integrity through the extrusion process.

11. The method of claim 9 in which the preform is extruded to a constant reduced diameter in a region along its axis, and the step of removing the transverse section includes removing a plurality of adjacent transverse sections at the constant reduced diameter.

12. The method of claim 1 in which the transverse section of the collapsed preform has a mating surface adjacent to the array of optical conveyances, and further comprising the step of polishing the mating surface along with tips of the assembled fibers.

13. The method of claim 1 in which the step of mounting includes inserting a lens array between the transverse section and the common support of the optical conveyances to improve coupling efficiency between the array of fibers and the array of optical conveyances.

14. The method of claim 1 in which the step of assembling includes securing the assembled fibers within the holes of the transverse section with adhesive.

15. The method of claim 1 in which the step of assembling includes assembling the fibers within the holes prior to the step of collapsing.

16. The method of claim 15 in which the step of arranging the preform includes forming the preform from a material that has a lower transition temperature than the fibers of the array of optical fibers.

17. The method of claim 1 in which the array of optical conveyances is an array of emitters.

18. The method of claim 17 in which the array of emitters includes vertical cavity surface emitting lasers formed on a surface of a wafer that also functions as the common support of the array of lasers.

19. The method of claim 18 in which the step of mounting includes mounting the transverse section of the collapsed preform to the surface of the wafer.

20. The method of claim 19 including the further step of inserting a lens array between the transverse section and the surface of the wafer to improve coupling efficiency between the array of fibers and the array of lasers.

21. The method of claim 1 in which both the array of fibers and the array of optical conveyances are arranged as two-dimensional arrays, and the step of mounting includes individually aligning two of the fibers with two of the optical conveyances for collectively aligning a remainder of the array of fibers with a remainder of the array of optical conveyances.

22. A method of arranging optical fibers in a desired array format comprising steps of:
   fabricating a preform having an axis and axially extending holes arranged in a predetermined pattern;
   preparing the preform to a malleable state;
   applying a cross-sectional reducing force that reduces a scale of the predetermined pattern of holes in the preform;
   removing a transverse section from the reduced preform at which the predetermined pattern is reduced in scale; and mounting the optical fibers in the axially extending holes to arrange the fibers in the desired array format.

23. The method of claim 22 in which the step of fabricating the preform includes extruding the preform through a die that forms the axially extending holes.

24. The method of claim 22 in which the step of fabricating includes assembling the preform from a bundle of rods.

25. The method of claim 24 in which the step of fabricating includes assembling the preform from a bundle of tubes.

26. The method of claim 22 in which the preform is a cylindrical preform made of glass, glass-ceramic, or ceramic to provide thermal stability.

27. The method of claim 26 in which the cylindrical preform has an initial diameter prior to the step of applying the reducing force, and the transverse section is a plate-shaped form having an ensuing diameter reduced by at least 25 percent.

28. The method of claim 22 in which the step of preparing the preform includes heating the preform to a malleable state.

29. The method of claim 22 in which the step of applying the cross-sectional reducing force includes applying a drawing force that stretches the preform along its axis, reducing a scale of the predetermined pattern of holes.

30. The method of claim 29 in which the step of removing the transverse section includes selecting the transverse section in a position along the preform axis at which the predetermined pattern is reduced to a predetermined scale.

31. The method of claim 22 in which the step of applying the cross-sectional reducing force includes applying an extruding force that forces the preform through a reducing die for reducing a scale of the predetermined pattern of the holes.

32. The method of claim 31 including a further step of filling the holes with a material for preserving hole integrity through the extrusion process.

33. The method of claim 22 in which the step of removing includes slicing the transverse section from the reduced preform.

34. The method of claim 22 in which the step of mounting includes assembling the optical fibers in the transverse section and securing the optical fibers in the axially extending holes of the transverse section with adhesive.

35. The method of claim 22 in which the step of mounting includes assembling the optical fibers in the preform, and the step of applying the reducing force secures the optical fibers in the axially extending holes of the transverse section by reducing diameters of the holes.

36. The method of claim 35 in which the step of fabricating the preform includes fabricating the preform from a material that has a lower transition temperature than the optical fibers secured in the axially extending holes of the preform.

37. The method of claim 22 in which the axially extending holes formed in the preform have diameters larger than diameters of the optical fibers, and the step of applying the reducing force reduces diameters of the holes in the transverse section of the preform.

38. The method of claim 22 including a further step of polishing a surface of the transverse section together with tips of the optical fibers for providing a smooth surface for coupling the optical fibers in the desired array format to a similarly patterned array of optical conveyances.

39. A plurality of optical fibers arranged in the desired array format according to the method of claim 22 in which the preform is made of a thermally stable material.

40. The optical fiber arrangement of claim 39 in which the transverse section of the reduced preform has a working surface through which tips of the fibers are exposed for coupling light into or out of the fibers.

41. The optical fiber arrangement of claim 39 in which the working surface of the preform section is polished together with tips of the optical fibers to provide a smooth surface for coupling the optical fibers in the desired array format to a similarly patterned array of optical conveyances.

42. A coupling system for coupling an array of optical fibers to an array of optical conveyances comprising:

a transverse section of a collapsed preform having an array of holes containing tips of an array of optical fibers, in which the collapsed preform is formed from a cylindrical preform that is reduced in diameter by a cross-sectional reducing force to a diameter at which the array of holes is scaled to match a spacing pattern of the array of optical conveyances;

the tips of the array of optical fibers exposed in a coupling surface of the transverse section;

a common support of an array of optical conveyances having a coupling surface through which the array of optical conveyances is exposed; and the transverse section being joined to the common support to collectively couple the array of optical fibers to the array of optical conveyances.

43. The system of claim 42 in which the cylindrical preform is made of one of a glass material, a glass-ceramic material, and a ceramic material for thermal stability.

44. The system of claim 42 in which the coupling surface of the transverse section is polished together with the tips of the fibers to provide an uninterrupted surface for coupling.

45. The system of claim 42 in which both the transverse section and the common support have adjacent planar mounting surfaces.

46. The system of claim 45 in which both the transverse section and the common support are plate-shaped to form a compact coupling structure.

47. The system of claim 42 further comprising a lens assembly mounted between the coupling surfaces of the transverse section and the common support to transmit light more efficiently between the array of optical fibers and the array of optical conveyances.

48. The system of claim 47 in which both the transverse section and the lens assembly are formed as plate-shaped bodies that can be stacked together with the common support for the array of optical conveyances.

49. The system of claim 42 in which the array of optical conveyances includes an array of passive devices for transmitting light.

50. The system of claim 42 in which the array of optical conveyances includes an array of active devices for emitting or receiving light.

51. The system of claim 50 in which the common support is a wafer on which the array of optical conveyances is formed as an array of vertical cavity surface emitting lasers.

* * * * *